(12) United States Patent
Kim

(10) Patent No.: US 6,295,261 B1
(45) Date of Patent: Sep. 25, 2001

(54) METHOD AND APPARATUS FOR CONTROLLING REVOLUTION SPEED OF SPINDLE MOTOR IN OPTICAL DISK DRIVE

(75) Inventor: Se-Tae Kim, Suwon-shi (KR)

(73) Assignee: Amsung Electronics Co., Ltd., Uwon (KR)

( * ) Notice: Subject to any disclaimer, the term of this patent is extended or adjusted under 35 U.S.C. 154(b) by 0 days.

(21) Appl. No.: 09/199,277

(22) Filed: Nov. 25, 1998

(30) Foreign Application Priority Data

Nov. 25, 1997 (KR) .................................................. 97/62798

(51) Int. Cl.$^7$ ....................................................... G11B 7/00
(52) U.S. Cl. ........................................ 369/53.3; 369/53.37
(58) Field of Search ................................. 369/50, 48, 47, 369/54, 47.36, 53.3, 53.37

(56) References Cited

U.S. PATENT DOCUMENTS 5,686,807 * 11/1997 Kusano et al. ........................ 318/808

FOREIGN PATENT DOCUMENTS 2-164294 * 6/1990 (JP) ........................................ 369/50

* cited by examiner

Primary Examiner—Nabil Hindi
(74) Attorney, Agent, or Firm—Staas & Halsey LLP

(57) ABSTRACT

A method of controlling a revolution speed of a spindle motor in an optical disk drive. Target RPMs and actual PWM signal values for maintaining the target RPMs are calculated according to recording linear velocities of an optical disk, and stored in a memory. The spindle motor is controlled by a PWM signal value greater than an actual PWM signal value for maintaining a desired target RPM, until an RPM of the spindle motor reaches the target RPM. Further, the spindle motor is controlled by the actual PWM signal value for maintaining the target RPM, when the RPM of the spindle motor reaches the target RPM.

21 Claims, 5 Drawing Sheets

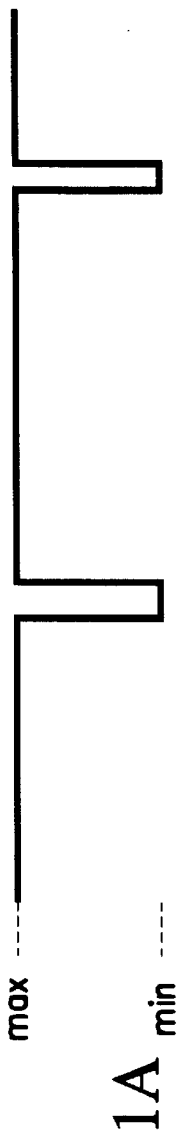
PRIOR ART FIG. 1A
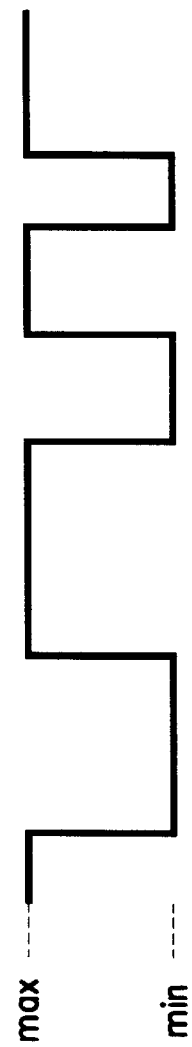
PRIOR ART FIG. 1B
PRIOR ART FIG. 1C

METHOD AND APPARATUS FOR CONTROLLING REVOLUTION SPEED OF SPINDLE MOTOR IN OPTICAL DISK DRIVE

CROSS-REFERENCE TO RELATED APPLICATIONS

This application claims the benefit of Korean Application No. 62798/1997, filed Nov. 25, 1997, in the Korean Patent Office, the disclosure of which is incorporated herein by reference.

BACKGROUND OF THE INVENTION

1. Field of the Invention

The present invention relates to an optical disk drive, and more particularly, to a method and apparatus for controlling a revolution speed of a spindle motor for driving an optical disk.

2. Description of the Related Art

An optical disk drive rotates an optical disk by using a spindle motor and reads information recorded in the optical disk by detecting a change of a laser beam reflected from the optical disk. The optical disk drive is classified into several types according to functions, and each type of optical disk drive includes a disk loading/unloading mechanism, a spindle motor for rotating the optical disk, an electronic circuit for reproducing information read from the optical disk, and a controller which controls a flow of commands, states of flags, and data communication between the electronic circuit and a host such as a personal computer.

In reading information from the optical disk, the optical disk drive rotates the spindle motor depending on CLV (Constant Linear Velocity) control or CAV (Constant Angular Velocity) control, and reads digital information, in the form of an RF (Radio Frequency) signal, recorded in the optical disk by using an optical pickup.

To control revolution of the spindle motor, the controller detects a present revolution speed (i.e., RPM (Revolutions Per Minute)) of the spindle motor. For example, the drive detects the revolution speed by reproducing synchronous information arranged at regular intervals in the information read from the optical disk. Alternatively, the drive can detect the revolution speed by using a Hall sensor prepared in the spindle motor. When the revolution speed of the spindle motor is over 8× speed (8×216 RPM), it is preferable to detect the revolution speed by using hardware such as the Hall sensor in controlling the revolution speed. The above methods of detecting the revolution speed of the spindle motor ar both well known.

In controlling the revolution speed of the spindle motor by CAV control, the controller provides a spindle motor drive with a PWM (Pulse Width Modulation) signal shown in FIGS. 1A to 1C. The spindle motor driver then drives the spindle motor according to the PWM signal. Subsequently, the controller receives an FG (Frequency Generator) signal (including revolution velocity information) from the spindle motor and controls a pulse width of the PWM signal according to the FG signal. The controller outputs the PWM signal of FIG. 1A during a kick interval to kick up the revolution speed of the spindle motor to a target RPM, and outputs the PWM signal of FIG. 1B during a brake interval to brake down the spindle motor. Further, when the spindle motor reaches the target RPM, the controller outputs the PWM signal of FIG. 1C to maintain the target RPM. It is noted from FIGS. 1A to 1C that the PWM signal has a different pulse width according to operation intervals of the spindle motor.

Conventionally, even when the spindle motor reaches and maintains the target RPM, the controller continues to output the PWM signal of FIG. 1C fluctuating between a maximum level and a minimum level at regular intervals, which leads to an increase in the current consumption and instability of a spindle servo. That is, when the PWM signal goes to the minimum level from the maximum level and vice versa, a current is abruptly supplied to the spindle motor through the spindle motor driver, thereby causing an increase in the current consumption. Further, fluctuation of the PWM signal between the maximum level and minimum level brings about an instantaneous change of the revolution speed of the spindle motor, which causes instability of the spindle servo.

Moreover, the great voltage difference between the maximum level and the minimum level may be the cause of heat generation in the controller, and the continuous fluctuation of the PWM signal may overload the controller. Further, since the spindle motor reaches the target RPM depending upon the PWM signals for the kick and brake operations, it takes a relatively long time to reach the target RPM.

SUMMARY OF THE INVENTION

It is therefore an object of the present invention to provide a method of stably maintaining a revolution speed of a spindle motor.

It is another object of the present invention to provide a method of reducing a time required in reaching a desired revolution speed of a spindle motor.

It is still another object of the present invention to provide a method of controlling a revolution speed of a spindle motor with reduced current consumption.

Additional objects and advantages of the invention will be set forth in part in the description which follows and, in part, will be obvious from the description, or may be learned by practice of the invention.

To achieve the above and other objects of the present invention, there is provided a method of controlling a revolution speed of a spindle motor in an optical disk drive. In the method, target RPMs and actual PWM signal values for maintaining the target RPMs are calculated according to recording linear velocities of an optical disk, and stored in a memory. The spindle motor is controlled by a PWM signal value greater than an actual PWM signal value for maintaining a desired target RPM until an RPM of the spindle motor reaches the target RPM. Further, the spindle motor is controlled by the actual PWM signal value for maintaining the target RPM, when the RPM of the spindle motor reaches the target RPM.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings:

FIGS. 1A to 1C are diagrams illustrating waveforms of a PWM signal for conventional CAV control of a spindle motor;

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

Figure 2:
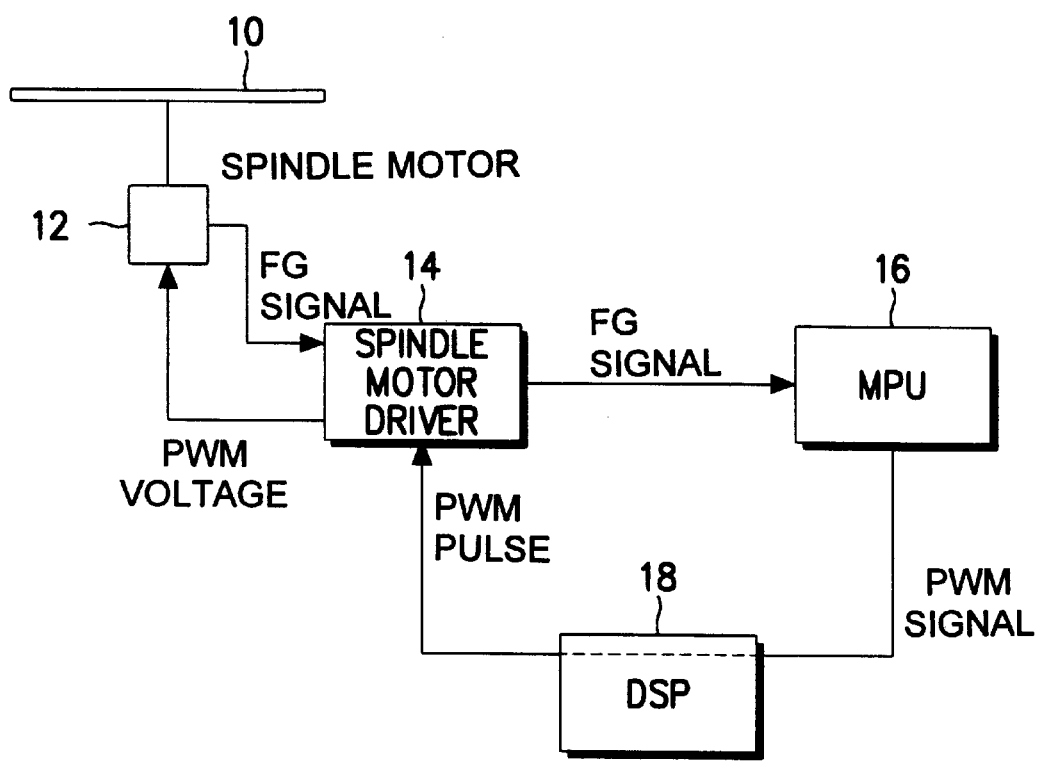
FIG. 2 a block diagram of a CAV control servo to which the present invention is applied.

FIG. 2 illustrates a CAV control servo to which the present invention is applied. Referring to FIG. 2, a spindle motor 12 rotates an optical disk 10 having a plurality of tracks on which information is recorded. An FG signal generated from a Hall sensor, prepared for the CAV control in the spindle motor 12, is applied to a microprocessor unit (MPU) 16, being a system controller, through a spindle motor driver 14. The MPU 16 generates a PWM signal for controlling revolution of the spindle motor 12 according to the FG signal. A digital signal processor (DSP) 18 generates a PWM pulse according to the PWM signal output from the MPU 16. The spindle motor driver 14 provides the spindle motor 12 with a PWM voltage according to the PWM pulse output from the DSP 18 so that the spindle motor 12 rotates at a constant angular velocity (CAV).

Figure 3:
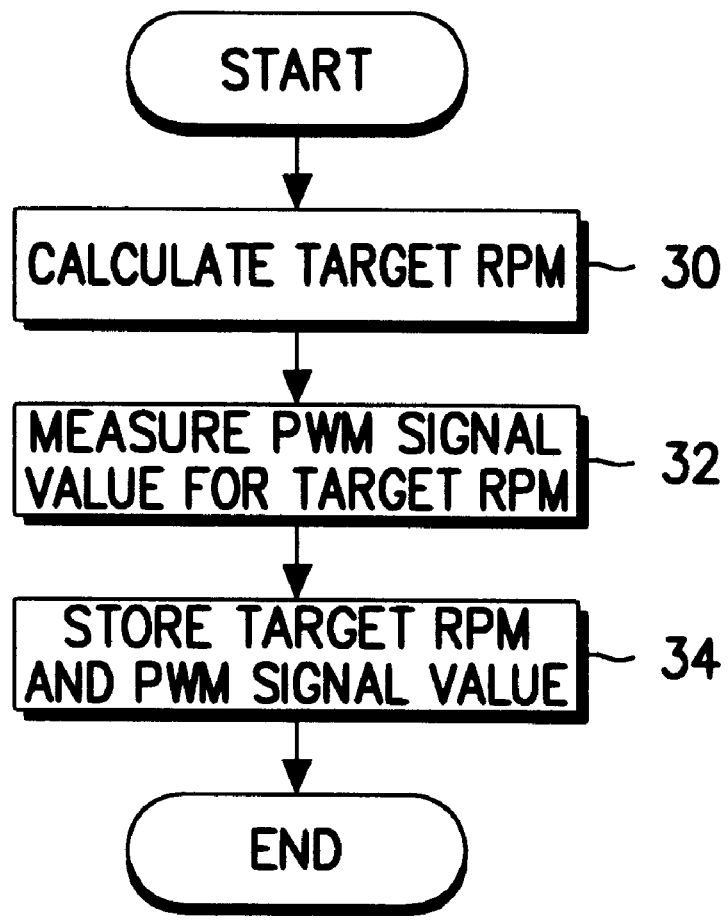
FIG. 3 is a flowchart illustrating a process for tabling target RPMs and PWM signal values with respect to a linear velocity according to an embodiment of the present invention and using the CAV control servo shown in FIG. 1.

FIG. 3 illustrates a flowchart for tabling target RPMs and PWM signal values with respect to linear velocities according to an embodiment of the present invention. Referring to FIG. 3, the MPU 16 calculates a target RPM of the spindle motor 12 according to the recording linear velocity of the optical disk 10, in step 30. In calculating the target RPM, the MPU 16 increases the linear velocity of the optical disk 10 from 1.2 m/s to 1.4 m/s by 0.01 m/s. The target RPM of the spindle motor 12 is calculated by (frequency (recording linear velocity)×60× a multiple of velocity), and the recording linear velocity is calculated by (distance of one round of the disk/time required in taking the one round of the disk). The multiple of velocity may be that of the spindle motor and, more precisely, the velocity is a data transfer rate of the optical disk 10 and is standardized at 15 Kbyte/sec. The distance for one round of the disk can be determined by counting the FG signal. The MPU 16 calculates a target RPM and corresponding actual PWM signal value each time a new optical disk is loaded into the optical disk player.

After calculating the target RPM, the MPU 16 increases in step 32 the PWM signal value until the spindle motor 12 reaches the calculated target RPM, so as to measure a corresponding actual PWM signal value. The actual PWM signal value is variable according to a status of the optical disk drive and a type of the spindle motor 12. After measuring the actual PWM signal value, the MPU 16 maps in step 34 the calculated target RPM and the measured actual PWM signal value in an RPM table prepared in a memory thereof, with respect to the recording linear velocity of the optical disk 10.

Table 1 illustrates the RPM table for a 24× speed optical disk drive, made by the process of FIG. 3.

TABLE 1

| Linear Velocity | Target RPM | Actual PWM Signal Value |
| --- | --- | --- |
| 1.20 | 4758 | 80H |
| 1.21 | 4776 | 88H |
| 1.22 | 4800 | 90H |
| 1.23 | 4824 | 90H |
| 1.24 | 4848 | 98H |
| 1.25 | 4872 | 9AH |
| 1.26 | 4896 | A1H |
| 1.27 | 4920 | A4H |
| 1.28 | 4944 | AAH |
| 1.29 | 4968 | B8H |
| 1.30 | 4968 | BCH |
| 1.31 | 4992 | BDH |
| 1.32 | 5016 | C2H |
| 1.33 | 5040 | C9H |
| 1.34 | 5064 | CDH |
| 1.35 | 5088 | D2H |
| 1.36 | 5112 | D7H |
| 1.37 | 5136 | D9H |
| 1.38 | 5160 | E4H |
| 1.39 | 5184 | E9H |
| 1.40 | 5208 | F2H |

Thus, if a specific optical disk is loaded, one of the linear velocities in Table 1 is uniquely set according to the feature of the specific loaded optical disk, and one of the target RPMs in Table 1 is determined to be used, according to the set linear velocity. Table 1 indicates which one of the linear velocities (or target RPMs) should be set according to the feature of the specific loaded disk. The linear velocity and target RPM of the loaded optical disk is set according to the number of detected frame synchronous signals after the loaded optical disk is rotated. For example, if the linear velocity is determined to be "1.20," then the target RPM is determined to be "4758" according to Table 1.

Figure 4:
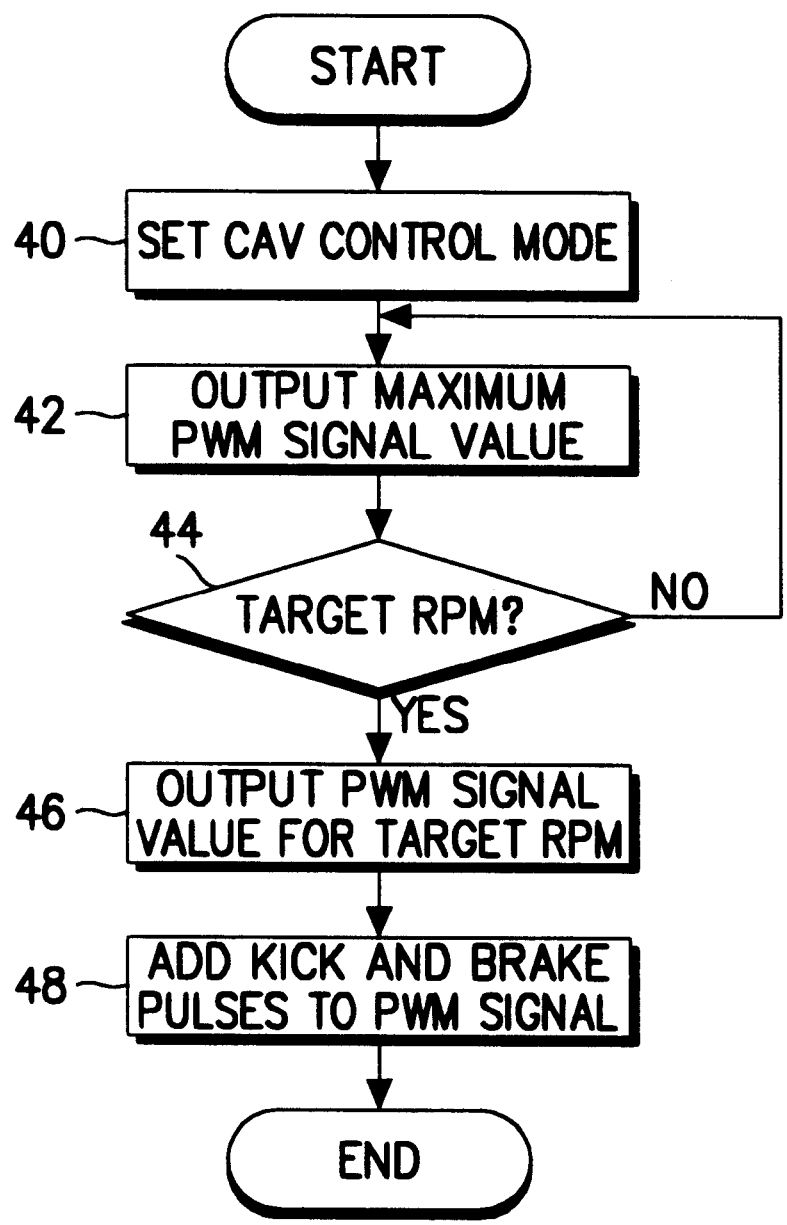
FIG. 4 is a flowchart illustrating a process for controlling a revolution speed of a spindle motor according to the embodiment of the present invention and using the CAV control servo shown in FIG. 1.
Figure 5A:
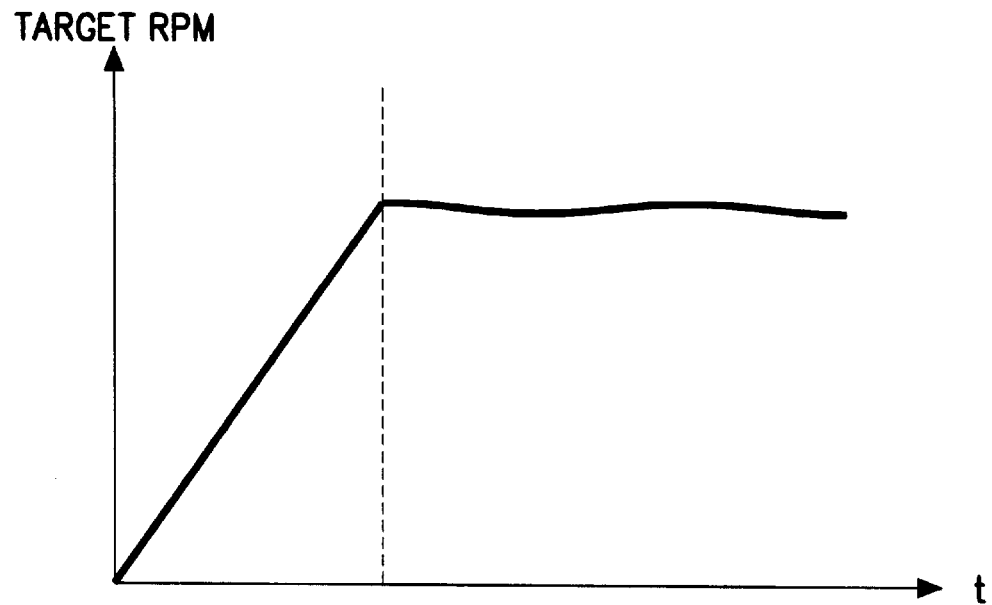
FIG. 5A is a diagram illustrating an RPM profile according to the embodiment of the present invention.
Figure 5B:
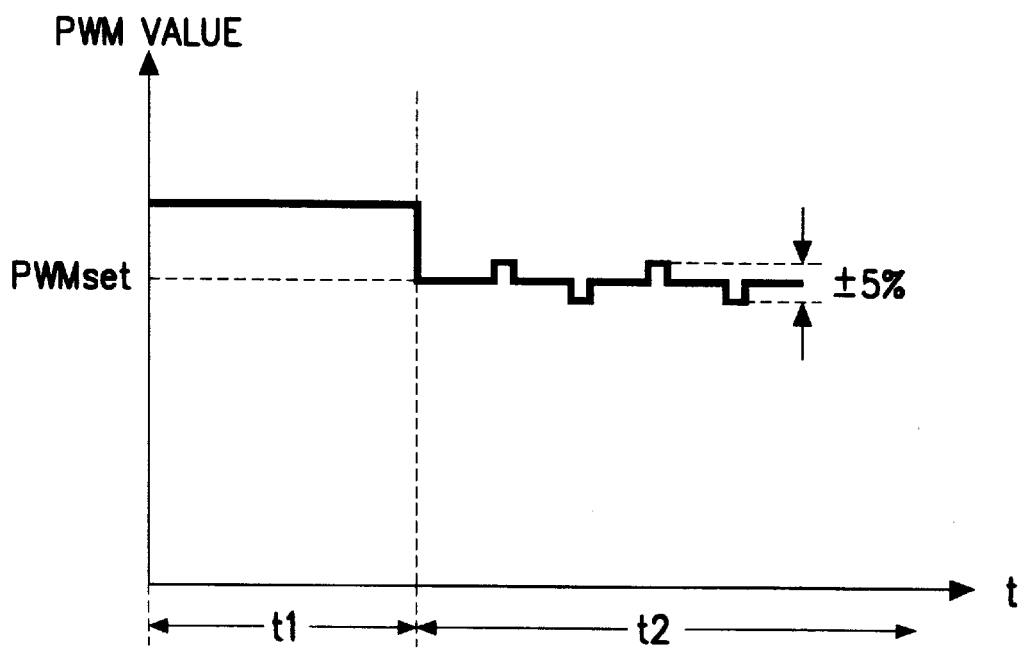
FIG. 5B is a diagram illustrating a waveform of a PWM signal according to the embodiment of the present invention.

FIG. 4 is a flowchart illustrating a process for controlling a revolution speed of the spindle motor according to the embodiment of the present invention, FIG. 5A illustrates an RPM profile according to the embodiment of the present invention, and FIG. 5B illustrates a waveform of the PWM signal according to the embodiment of the present invention.

Referring to FIGS. 2 through 5B, reference will be made to an operation of controlling the revolution speed of the spindle motor according to the embodiment of the present invention. The MPU 16 sets the system to a CAV control mode in step 40, to rotate the spindle motor 12 by the CAV control. In step 42, the MPU 16 outputs a PWM signal value greater than the mapped PWM signal value for maintaining a specific target RPM, so as to accelerate the spindle motor 12 to the specific target RPM as soon as possible. The target RPM is set according to the optical disk which is loaded into the optical disk player. More specifically, the linear velocity and target RPM of the loaded optical disk are set according to the number of the detected frame synchronous signal when the loaded optical disk is once (for example) rounded. Preferably, the MPU 16 outputs the maximum PWM signal value as shown in FIG. 5B. Accordingly, the spindle motor 12 can quickly reach the target RPM in a time interval t1.

The MPU 16 judges in step 44 whether a detected RPM of the spindle motor 12 is equal to the specific target RPM (i.e., whether the spindle motor 12 reaches the specific target RPM). If the detected RPM is equal to the target RPM, the MPU 16 changes in step 46 the present PWM signal value to the actual PWM signal value (i.e., PWMset of FIG. 5B) corresponding to the target RPM mapped in Table 1. Then, the DSP 18 outputs a PWM pulse corresponding to the present PWM signal value, so that the spindle motor 12 rotates at the target RPM in a time interval t2, thereby maintaining the constant angular velocity of the spindle motor 12.

In the case that the spindle motor 12 does not maintain the constant angular velocity despite the revolution control due to the deviation of the optical disk drive, the MPU 16 detects in step 48 the RPM of the spindle motor 12 and adds fine kick and brake pulses to the PWM signal according to the detection result (see FIG. 5B). It is preferable that the fine kick and brake pulses have an amplitude ∓5% of the actual PWM signal value PWM set. In this manner, it is possible to rotate the spindle motor 12 at the constant angular speed.

In summary, the target RPMs of the spindle motor and the actual PWM signal values for maintaining the target RPMs are mapped in the RPM table with respect to the recording linear velocity of the disk. The MPU initially outputs the maximum PWM signal value to accelerate (kick up) the spindle motor to the target RPM in a short time and then changes the PWM signal value to the mapped (i.e., actual) PWM signal value to maintain the constant RPM of the spindle motor.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling a revolution speed of a spindle motor on which an optical disk is mounted having recording linear velocities in an optical disk drive, comprising the steps of:

(a) calculating target RPMs (Revolutions Per Minute) and actual PWM (Pulse Width Modulation) signal values for maintaining the target RPMs according to the recording linear velocities of the optical disk, and storing the target RPMs and the actual PWM signal values in a table;

(b) controlling the revolution of the spindle motor with a PWM signal value greater than one of the actual PWM signal values for maintaining one of the target RPMs until an RPM of the spindle motor reaches the one target RPM; and (c) controlling the revolution of the spindle motor with the one actual PWM signal value for maintaining the one target RPM, in response to the RPM of the spindle motor reaching the one target RPM.

2. The method as claimed in claim 1, further comprising the steps of:

detecting the RPM of the spindle motor; and adding kick and brake pulses to the one actual PWM signal value corresponding to the one target RPM according to the detected RPM while controlling revolution of the spindle motor with the one actual PWM signal for maintaining the one target RPM.

3. The method as claimed in claim 2, wherein the kick and brake pulses have an amplitude ∓5% of the one actual PWM signal value corresponding to the one target RPM.

4. The method as claimed in claim 1, wherein the PWM signal value greater than the actual PWM signal value is a maximum PWM signal value used for controlling the revolution of the spindle motor.

5. The method as claimed in claim 1, wherein said step (a) comprises the steps of:

calculating the target RPMs of the spindle motor according to the recording linear velocities of the optical disk;

measuring the actual PWM signal values corresponding to the calculated target RPMs; and mapping the calculated target RPMs and the measured actual PWM signal values in association with the recording linear velocities of the optical disk.

6. The method as claimed in claim 5, wherein the target RPMs and the actual PWM signal values are calculated by increasing the recording linear velocities from 1.2 m/s to 1.4 m/s by 0.01 m/s.

7. The method as claimed in claim 1, wherein:

each target RPM is determined as frequency (recording velocity)×60×a multiple of velocity; and each recording linear velocity is determined as distance of one round of the optical disk/time required to make the one round of the optical disk.

8. A method of controlling a revolution speed of a spindle motor on which an optical disk having recording linear velocities is mounted at a CAV (constant angular velocity) in an optical disk drive, comprising the steps of:

calculating target RPMs (Revolutions Per Minute) of the spindle motor according to recording linear velocities of the optical disk;

measuring actual PWM (Pulse Width Modulation) values corresponding to the calculated target RPMs;

mapping the calculated target RPMs and the actual PWM signal values in association with the recording linear velocities in a table of a memory;

controlling the revolution of the spindle motor with a maximum PWM signal value used for controlling the revolution of the spindle motor until an RPM of the spindle motor reaches one of the target RPMs at an initial RPM control; and controlling the revolution of the spindle motor with the actual PWM signal value corresponding to the one target RPM, in response to the RPM of the spindle motor reaching the target RPM.

9. The method as claimed in claim 8, wherein the kick and brake pulses have an amplitude ∓5% of the actual PWM signal value corresponding to the one target RPM.

10. The method as claimed in claim 8, wherein:

each target RPM is determined as frequency (recording velocity)×60×a multiple of velocity; and each recording linear velocity is determined as distance of one round of the optical disk/time required to make the one round of the optical disk.

11. A method of controlling a revolution speed of a spindle motor on which an optical disk is mounted in an optical disk drive, comprising the steps of:

(a) controlling revolution of the spindle motor with a first PWM (Pulse Width Modulation) signal greater than a second PWM signal used for maintaining a target RPM (Revolutions Per Minute) of the spindle motor until the spindle motor reaches the target RPM; and (b) controlling the revolution of the spindle motor with the second PWM signal to maintain the target RPM of the spindle motor as a result of the spindle motor reaching the target RPM.

12. The method as claimed in claim 11, wherein said step (b) comprises the steps of:

detecting the actual RPM of the spindle motor; and adding kick and brake pulses to the second PWM signal in accordance with the detected actual RPM of the spindle motor, to maintain the target RPM of the spindle motor.

13. The method as claimed in claim 11, further comprising the step of:
   determining target RPMs of the spindle motor based upon recording linear velocities of the optical disk;
   determining actual RPMs of the spindle motor based upon corresponding ones of the target RPMs; and
   selecting one of the target RPMs and corresponding actual RPM to be used in said steps (a) and (b).

14. A constant angular velocity (CAV) control servo to control a revolution of a spindle motor on which an optical disk having recording linear velocities is mounted in an optical disk drive, comprising:
   a determination unit to determine target RPMs (Revolutions Per Minute) and actual PWM (Pulse Width Modulation) signal values for maintaining the target RPMs according to the recording linear velocities of the optical disk;
   a storage device to store the target RPMs and the corresponding actual PWM signal values in a table; and
   a drive unit to drive the spindle motor in accordance with a drive signal; and
   a drive signal generator to generate the drive signal as a set PWM signal greater than one of the actual PWM signal values for maintaining one of the target RPMs until an RPM of the spindle motor reaches the one target RPM, and to generate the drive signal as the one PWM for maintaining the one target RPM in response to the spindle motor reaching the target RPM.

15. The CAV control servo as claimed in claim 14, wherein the drive unit comprises:
   a digital signal processor (DSP) to convert the drive signal to PWM pulses; and
   a spindle motor driver to drive the spindle motor in accordance with the PWM pulses.

16. The CAV control servo as claimed in claim 14, wherein the determination unit determines the target RPMs of the spindle motor according to the recording linear velocities of the optical disk, measures the actual PWM signal values corresponding to the determined target RPMs, and maps the determined target RPMs and the measured actual RPM signal values in association with the recording linear velocities of the optical disk.

17. The CAV control servo as claimed in claim 14, further comprising a microprocessor which comprises the determination unit, storage device, and drive signal generator.

18. The CAV control servo as claimed in claim 15, further comprising:
   a detector to determine the RPM of the spindle motor, to generate an RPM signal;
   wherein the spindle motor driver outputs the RPM signal to the drive signal generator, and the drive signal generator adds kick and brake pulses to the drive signal for maintaining the one target RPM in accordance with the RPM signal.

19. A method to control a revolution speed of a spindle motor, comprising:
   changing the revolution speed of the spindle motor with a first Pulse Width Modulation (PWM) signal value having a first amplitude, until the spindle motor reaches a target RPM (revolution per minute); and
   maintaining the revolution speed of the spindle motor with a second PWM signal value having a second amplitude different from the first amplitude, after the spindle motor reaches the target RPM.

20. The method as claimed in claim 19, wherein the first amplitude is greater than the second amplitude.

21. The method as claimed in claim 19, further comprising:
   recording linear velocities of a disk mounted on an optical disk drive, wherein the optical disk drive is driven by said spindle motor;
   determining target RPM speeds and actual PWM signal values for maintaining the target RPM speeds based upon the recording of the linear velocities; and
   storing the target RPM speeds and the actual PWM signal values in a table.

* * * * *

UNITED STATES PATENT AND TRADEMARK OFFICE
CERTIFICATE OF CORRECTION

PATENT NO.     : 6,295,261 B1
DATED          : September 25, 2001
INVENTOR(S)    : Se-Tae Kim It is certified that error appears in the above-identified patent and that said Letters Patent is hereby corrected as shown below:

Title page,
Item [73] Assignees, change "Amsung" to -- Samsung --; change "Uwon" to -- Suwon --;

Column 6,
Line 38, after "RPM" insert the following two paragraphs:
--      detecting the RPM of the spindle motor; and
        adding kick and brake pulses to the actual PWM signal value corresponding to the one target RPM according to the detected RPM while controlling revolution of the spindle motor with the actual PWM signal for monitoring the one target RPM result --

Signed and Sealed this

Twenty-eighth Day of May, 2002

Attest:

*Attesting Officer*

JAMES E. ROGAN
*Director of the United States Patent and Trademark Office*